United States Patent [19]

DeSilva

[11] 4,278,062
[45] Jul. 14, 1981

[54] FUEL HEATING DEVICE

[76] Inventor: Manuel V. DeSilva, 27602 Harper, St. Clair Shores, Mich. 48081

[21] Appl. No.: 67,292

[22] Filed: Aug. 17, 1979

[51] Int. Cl.³ ............................................ F02M 31/00
[52] U.S. Cl. .................................. 123/552; 123/557
[58] Field of Search .............. 123/122 E, 133, 122 H, 123/557, 552; 165/39, 32, 51, 52

[56] References Cited

U.S. PATENT DOCUMENTS

| | | | |
|---|---|---|---|
| 2,289,635 | 7/1942 | Edelen | 123/552 |
| 2,788,779 | 4/1957 | Mengelkamp | 123/552 |
| 3,638,625 | 2/1972 | Jaimee | 123/122 H |
| 3,744,716 | 7/1973 | Charles | 236/87 |
| 3,918,421 | 11/1975 | Berry | 123/122 H |
| 3,951,124 | 4/1976 | Fairbanks | 123/122 E |
| 3,955,546 | 5/1976 | Lee | 123/557 |
| 3,986,486 | 10/1976 | Rabbiosi | 123/122 H |
| 4,027,639 | 6/1977 | Amano | 123/122 E |
| 4,044,742 | 8/1977 | Linder | 123/122 H |
| 4,072,138 | 2/1978 | Hawkins | 123/122 E |
| 4,099,501 | 7/1978 | Fairbanks | 123/122 E |
| 4,146,002 | 3/1979 | Quinn | 123/133 |
| 4,180,036 | 12/1979 | Wolf | 123/133 |

Primary Examiner—Ronald H. Lazarus
Attorney, Agent, or Firm—Burton, Parker & Schramm

[57] ABSTRACT

An engine fuel heater for an internal combustion engine where the fuel entering the carburetor is kept at a predetermined temperature regardless of ambient air conditions. The device includes a heat exchanger for transferring heat from the hot water of the engine to the gasoline, a read station where the temperature of the gasoline is read, a bi-metal thermostat responsive to the read station which controls whether a vacuum is maintained inside a vacuum chamber, the presence of a vacuum within the vacuum chamber controlling whether water flows into the heat exchanger.

8 Claims, 4 Drawing Figures

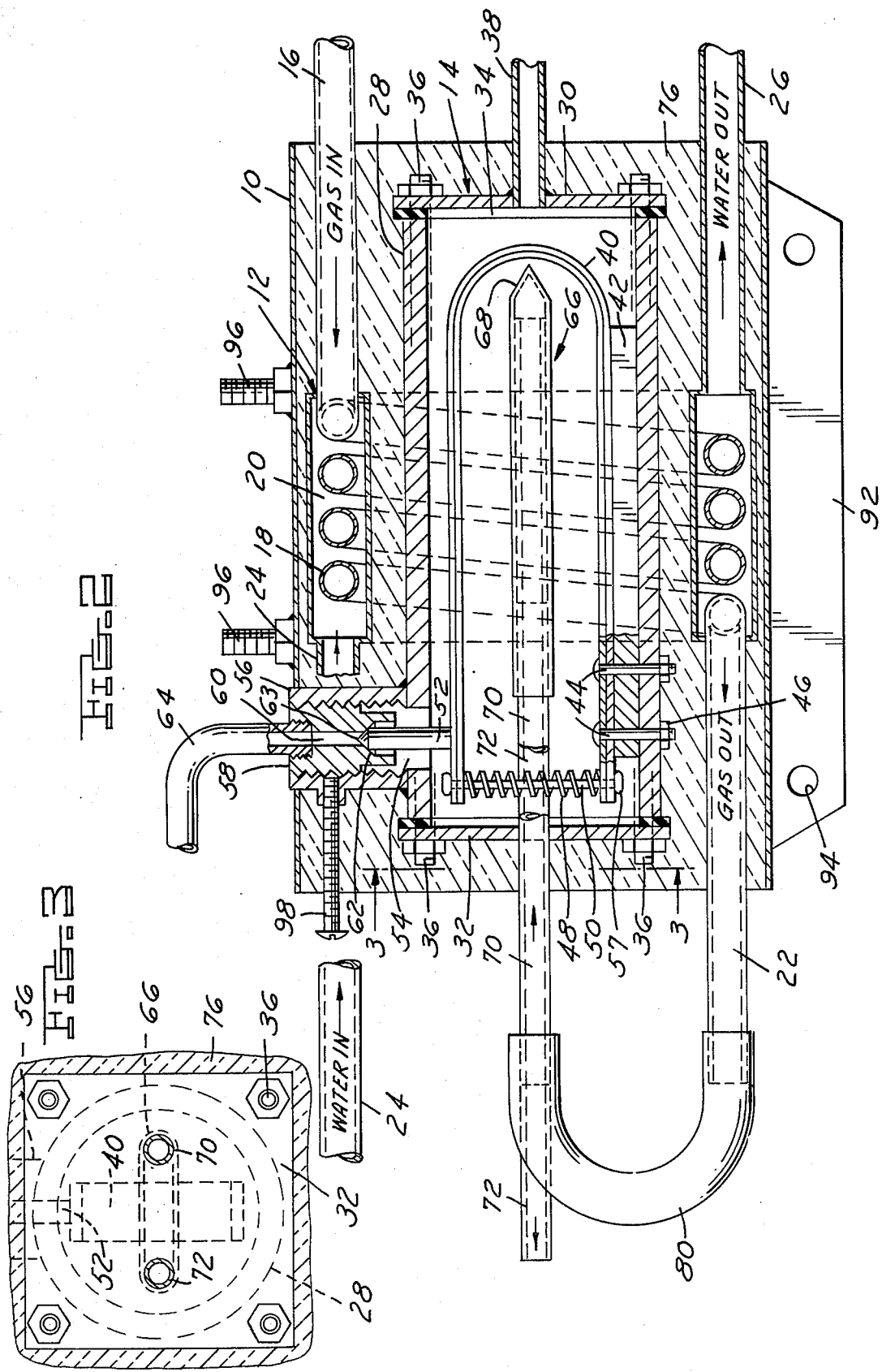

FUEL HEATING DEVICE

DESCRIPTION

BACKGROUND OF THE INVENTION

This invention relates to the fuel system of internal combustion engines of automobiles and the like. More particularly, it relates to a device for maintaining the temperature of the fuel entering the engine at a constant temperature regardless of the ambient temperature of the air around the engine.

It is well known that by feeding fuel into an internal combustion engine in a heated condition, the efficiency of the engine will be improved. In addition, the engine will generally burn cleaner so to give environmental advantages to such a system.

In the past there has been no simple system for heating the fuel to a constant temperature and maintaining that selected temperature regardless of the temperature of the surrounding air. The invention provides a device for giving the fuel entering the engine a constant temperature without the need of any auxiliary sources of energy other than those found in the normal internal combustion engine and through a simple design allows for easy adjustment of the device so that the temperature to which the fuel is heated can be varied so to maintain optimum performance regardless of season, type of engine or other variables.

SUMMARY OF THE INVENTION

The engine fuel heater of the invention has an insulated chamber with a vent which connects the chamber with the surrounding atmosphere when open. The heater also has a heat exchanger for heating the fuel. The heat exchanger uses heated exhaust of the engine, preferably hot water from the cooling system of the engine. Also provided is a fuel temperature read station within the chamber through which the fuel passes after moving through the heat exchanger. A temperature sensitive element is mounted within the chamber so that a portion of the element moves relative the vent in response to the fuel temperature within said station. On said portion of the element is mounted a valve member that determines whether the vent is opened or closed based upon the position of said portion. The heater also has means responsive to the presence or absence of the vacuum in the chamber to control the flow of the heating medium into the heat exchanger.

BRIEF DESCRIPTION OF THE DRAWINGS

FIG. 2 is a sectional view of the engine fuel heater taken along line 2—2.

FIG. 3 is a sectional view taken along line 3—3.

DESCRIPTION OF THE PREFERRED EMBODIMENTS

Figure 1:
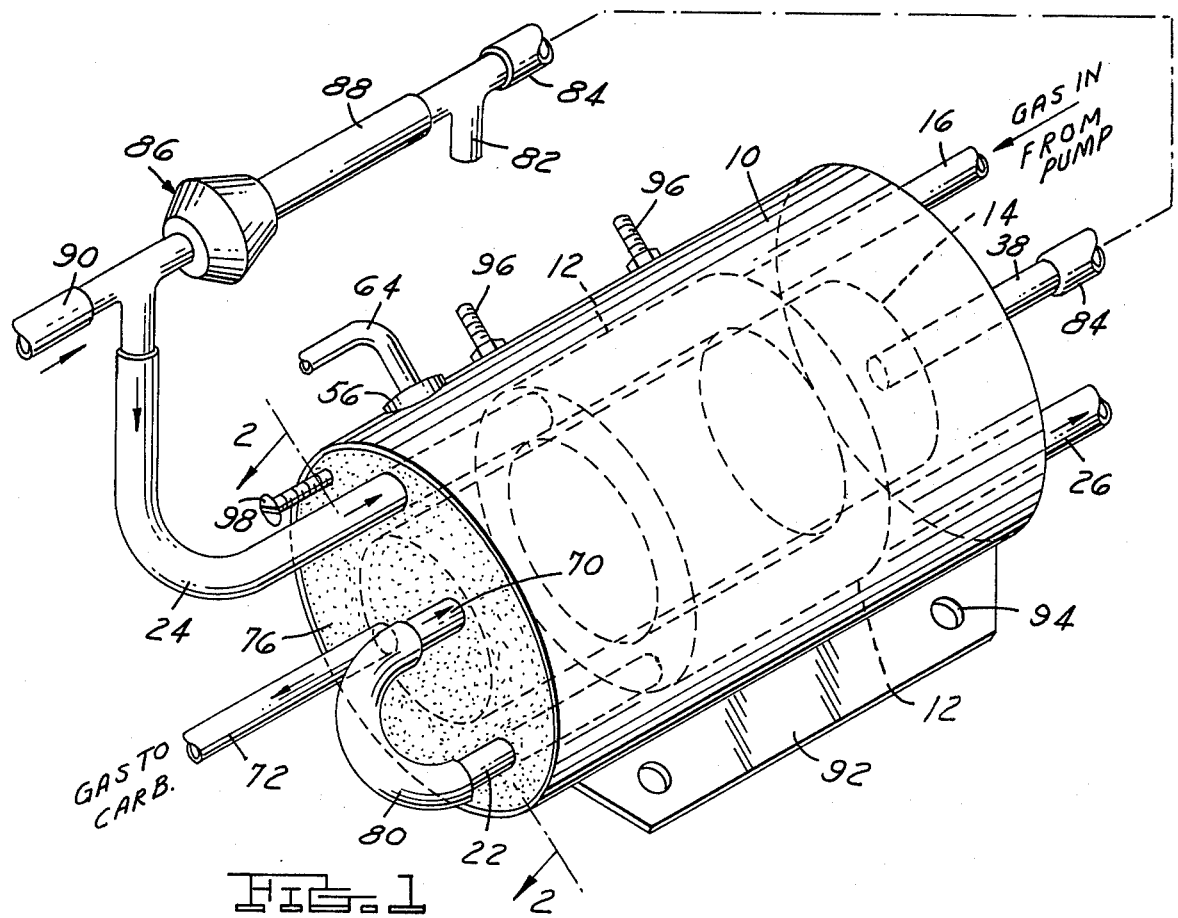
FIG. 1 is a perspective view of an engine fuel heater embodying the invention.
Figure 4:
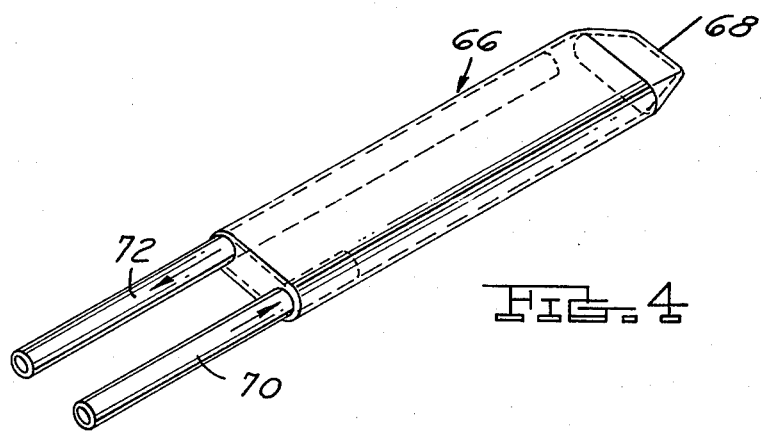
FIG. 4 is a perspective view of the fuel temperature read station of this embodiment.

Described is a fuel heater embodying the invention making use of gasoline as the fuel for the engine and hot water from the cooling system of the engine as the heating medium for the heat exchanger.

The basis components of the fuel heater are housed within an outer protective container 10. Two major components of the heater are a heat exchanger 12 and a vacuum chamber 14. Extending from the heat exchanger and out of the container are a number of tubes. Gas enters the device from the fuel pump through the fuel heat exchanger inlet 16 and passes through tubing 18 within the heat exchanger chamber 20 and then passes out of the heat exchanger through the gas heat exchanger outlet 22. Heated exhaust from the engine, preferably hot water from the cooling system, enters the heat exchanger through the water inlet 24, passes through the heat exchanger chamber 20 around the gas in the tubing 18 and exits through the water outlet 26 to re-enter the cooling system. As the hot water passes through the heat exchanger chamber, it will transfer its heat to the gas flowing through the tubing.

The vacuum chamber has an outer casing 28 which is a hollow tube, the ends of which are closed by plates 30 and 32. To insure a vacuum seal, gaskets 34 are placed between the casing and the end plates. The end plates are held together by through rods 36 extending from one end plate to the other. Attached to plate 30 is vacuum connector 38 which communicates to the interior of the chamber.

Inside the vacuum chamber there is positioned a temperature sensitive element in the form of a bi-metal U-shaped thermostat 40. The lower leg of the thermostat is positioned in the chamber by a shim strip 42 and held in place by means of thermostat mounting bolts 44 which pass through the casing 28 and are secured by lock nuts 46. The legs of the thermostat are held apart by thermostat differential spring 48. The spring is kept in place by support rod 50. This rod also has buttons 57 on its ends limiting the separation of the legs.

On the upper leg of the thermostat 40 there rides a needle 52 which passes through an opening 54 in the casing. Above the opening and extending through the outer protective container 10 is an internally threaded tube 56. In this tube is screwed valve seat member 58. The valve seat member has external threads to allow it to be moved up and down in tube 56. An orifice 60 is made through the middle of the seat member. The lower part of the orifice is shaped to form a valve seat 62 into which needle 52 acting as a valve member may sit. The conical top 63 of the needle is made of any material, such as rubber or brass, which insures a good seal when positioned against the valve seat. The top portion of the orifice is also widened and into this portion is threaded atmospheric inlet tube 64. The orifice 60, the atmospheric inlet tube 64 and the opening 54 in the casing provide a vent means by which the atmosphere outside the heater may communicate with the interior of the vacuum chamber when the needle is not pressed against valve seat 62.

Also placed within the vacuum chamber is fuel temperature read means 66 in the form of a generally rectangular container, one end of which has a V-shaped cross-sectional forward end 68. There is an inlet port 70 for the gasoline and outlet port 72. The inlet port extends a short distance into the container, while the outlet port extends into the container a substantial distance with its opening very near the forward end. The ports are placed on each side of the thermostat spring 48 and through plate 32 so that the container lies within the vacuum chamber between the legs of the thermostat with its forward end near the curved portion of the thermostat connecting the thermostat legs.

The outer protective container 10, the heat exchanger 12 and the vacuum chamber 14 are placed in spaced apart relationship with one another. The vacuum chamber forms the center of the unit with heat exchanger around it. Enclosing both these is the protective container. The space between and around the heat exchanger and vacuum chamber is filled with insulation 76. The preferred type of insulation for this purpose is diatomaceous earth using hydrostone as a binder, since it can be poured into the spaces to be insulated in a fluid form, but will harden into a cement which holds the components together in addition to insulating them.

Additional tubing is added to complete the device. The heat exchanger is connected to the temperature read means by joining the fuel outlet 22 to inlet port 70 by means of tubing 80. The vacuum connector 38 is joined to the vacuum hose tee 82 by vacuum hosing 84. Another portion of the tee is connected to a vacuum operated valve 86 by vacuum hose 88. The third portion of the tee is connected to the engine vacuum system (not shown). The vacuum operated valve controls the flow of hot water from the engine's cooling system in tubing 90 to the hot water inlet 24.

Means for supporting the fuel heater body are provided by lower mounting bracket 92 having holes 94 for attachment to engine mounts or the like. Additional mounting means are provided by mounting studs 96.

In operation, gasoline from the fuel pump (not shown) enters the fuel inlet 16 and passes through the heat exchanger and out the fuel outlet 22. It then enters the fuel temperature read means 66. The forward edge 68 is positioned adjacent the thermostat 40 causing the thermostat's upper leg to take a position corresponding to the temperature of the fuel. The gas in the fuel temperature read means then exits through the outlet port 72 and moves to the carburetor of the engine (not shown). Since the outlet port removes the gasoline from the forward portion of the container, the temperature of the gasoline being fed into the carburetor corresponds with the temperature being read by the thermostat.

Since it is important to have the temperature entering the carburetor at a controlled temperature regardless of the ambient temperature in the surrounding air of the gas as it passes through the fuel pump, means of controlling the amount of heat being transferred from the hot water to the fuel is provided. This is in the form of a vacuum control system. In a normal situation, spring 48 urges the legs of the thermostat 40 away from each other. The upper leg in turn pushes needle 52 against the valve seat 62, sealing the vacuum chamber from the outside atmosphere. A vacuum is then created within the vacuum chamber 14 since the chamber is connected to the car's vacuum system by means of vacuum connector 38. Likewise, a vacuum is created within vacuum hose 88 causing the vacuum operated valve 86 to allow the hot water from the engine's cooling system to pass the valve into the heat exchanger raising the temperature of the gasoline. As the temperature of the gasoline rises due to the heat transfer from the hot water, the bi-metal thermostat reacts against the force of the spring eventually causing the legs of the thermostat to move towards one another. This movement allows needle 52 to move away from the valve seat and thus allow the atmosphere to enter the vacuum chamber. When this happens, the vacuum is destroyed in the vacuum chamber and likewise the atmosphere is transferred through the tubing system to the vacuum operated valve. Releasing the vacuum causes the valve 86 to stop the flow of hot water into the heat exchanger preventing the gasoline from overheating.

As the gasoline begins to cool the thermostat applies less force against the spring causing the legs to move apart reseating the needle. Thus the vacuum is re-established, causing hot water to flow again. By this control of the vacuum within the vacuum chamber, the amount of heat transferred to the gasoline is easily and accurately controlled and thus the gasoline fed into the carburetor is kept at a constant temperature.

The temperature at which it is desired to have the gasoline can be controlled by loosening screw 98 so to allow the valve seat member to be screwed in or out, thus changing the position of the valve seat. The further end member 58 is positioned from opening 54 the lower the temperature of the gasoline will be before the legs move together releasing the needle. The screw 98 is tightened to lock member 58 in place at its desired position.

I claim:

1. An engine fuel heater for an engine which uses fuel fed to the engine by a fuel line and which exhaust a heated engine medium comprising:
    a heat exchanger along the fuel line for transferring heat from the exhaust medium to the fuel;
    an insulated vacuum chamber having vent means;
    a portion of the fuel line located between the engine and the heat exchanger passing through the chamber;
    a temperature sensitive element mounted within the chamber adjacent said fuel line portion and having a portion movable in response to temperature changes in said fuel line portion contacting said vent means;
    vacuum means for normally inducing a vacuum within the chamber;
    the vent means controlled by movement of said movable portion, the vent means when opened allowing communication of air to the chamber so to eliminate the vacuum normally found therein; and
    an exhaust medium control responsive to the presence or absence of a vacuum in the chamber so to control the flow of exhaust medium to the heat exchanger.

2. The fuel heater of claim 1 wherein the heated engine exhaust medium is hot water from the cooling system of the engine.

3. The fuel heater of claim 1 wherein the temperature sensitive element is a bi-metal strip.

4. The fuel heater of claim 3 wherein the bi-metal strip is U-shaped with said movable portion being one leg of the U and the fuel line portion being positioned near the portion of the strip connecting the legs.

5. The fuel heater of claim 4 wherein the fuel line portion within the vacuum chamber comprises an elongated chamber and where the temperature sensitive element is predominantly responsive to the temperature at but one end of the chamber and where the fuel flows into the chamber at substantially the end of the chamber opposite the end which is sensed and the fuel flows out of the chamber substantially near the end which is sensed.

6. The fuel heater of claim 5 wherein the elongated chamber is positioned between the legs of the U-shaped strip with its sensed end near the portion of the strip connecting the legs.

7. The fuel heat of claim 1 wherein the fuel line portion within the chamber includes an elongated chamber through which the fuel flows and where the temperature is sensed by the temperature sensitive element from but one end of the chamber and where the fuel flows into the chamber at substantially the end of the chamber opposite the end which is read and the gasoline flows out of the chamber substantially near the end which is read.

8. The fuel heater of claims 6 or 7 wherein the vacuum means comprise a connection to the vacuum produced by the engine itself.

* * * * *